Feb. 17, 1970     E. BROWN ET AL     3,495,546
SPEED CONTROL DEVICE FOR PIPELINE INSPECTION APPARATUS
Filed Nov. 3, 1967     3 Sheets-Sheet 2
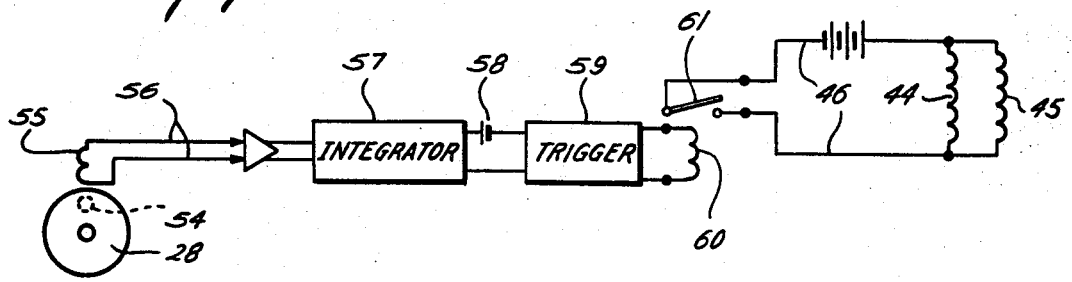
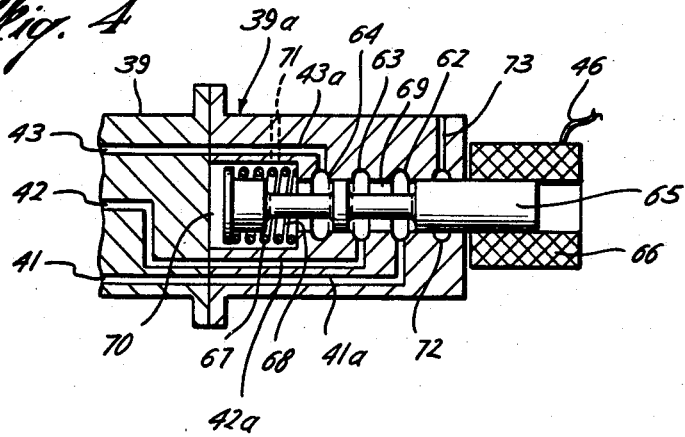
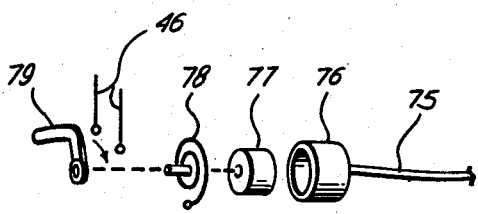
Ernest Brown
Dave D. Nagel
INVENTORS
BY Arnold, Roylance,
Kruger & Durkee
ATTORNEYS Feb. 17, 1970  E. BROWN ET AL  3,495,546
SPEED CONTROL DEVICE FOR PIPELINE INSPECTION APPARATUS
Filed Nov. 3, 1967  3 Sheets-Sheet 3

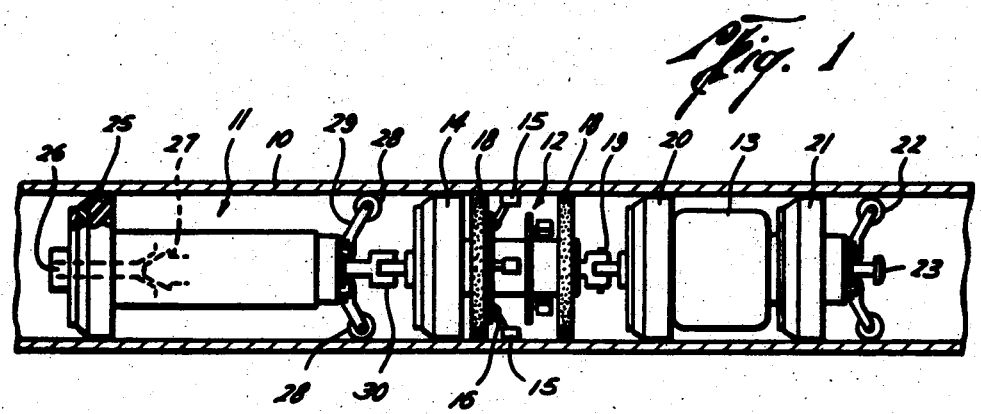
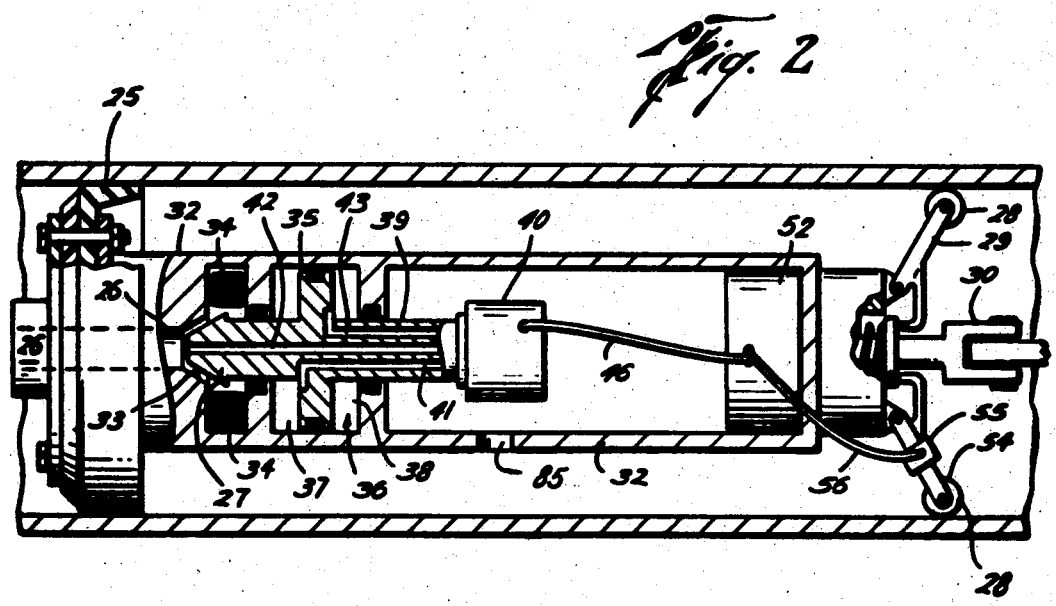

Ernest Brown
Dave D. Nagel
INVENTORS

BY Arnold, Roylance,
Kruger & Durkee
ATTORNEYS

United States Patent Office 3,495,546
Patented Feb. 17, 1970

3,495,546
SPEED CONTROL DEVICE FOR PIPELINE INSPECTION APPARATUS
Ernest Brown and Dave D. Nagel, Houston, Tex., assignors to American Machine & Foundry Company, New York, N.Y., a corporation of New Jersey
Filed Nov. 3, 1967, Ser. No. 680,552
Int. Cl. G01f 15/14; G01l 19/14; F28g 1/12
U.S. Cl. 104—155                                      22 Claims

ABSTRACT OF THE DISCLOSURE

This application discloses pipeline inspection apparatus propelled through the pipeline by the fluid product being transported, the fluid bearing against a resilient cup. The cup or drive rubber is selectively by-passed by a through port for speed control. A valve in the through port is powered by a piston and cylinder arrangement, either side of the piston being subjected to line pressure or vented downstream under control of an electrically-operated valve. The electrically-operated valve is energized by a speed responsive device such as a small wheel bearing on the pipeline wall driving an r.p.m. switch or the like.

---

Oil and gas products are transported from one locality to another in steel pipelines under high pressure, the pipelines often passing through heavily populated areas. Even though the pipelines are usually buried below ground, they may be a hazard to persons and property if not maintained in perfect condition. For this reason, it is common practice to periodically survey the pipelines for the purpose of detecting leaks or fractures, or detecting flaws or pits which may later result in leaks, in the metal walls of the pipe.

For the purpose of scanning the interior walls of the pipe for flaws and leaks, so-called "pigging apparatus" has been employed, this apparatus being propelled through the pipeline by the fluid product being transported. The usual pipeline contains many bends and twists which the pig must negotiate, and also obstructions will be encountered in the form of "icicles" of weld material, as well as discontinuities at valve seats, changes in diameter of the pipe, and various other obstructions. Depending upon the product being transported, the velocity of movement of the product through the line may be fairly high, twelve to fifteen miles per hour not being unusual. Thus the pigging apparatus must be able to withstand rather violent collisions in traveling through the pipeline, or alternatively the velocity of the pig must be controlled. Even though the pigging apparatus is mechanically rugged enough to withstand impacts occurring in travel at the speed of a product, the deflection of detector devices and bounce of the detector devices resulting from the impacts will generate noise and thus considerably reduce the effectiveness of the record made.

Pipeline pigging apparatus usually employs packers, which are annular cup-shaped rubber members, for the purpose of propelling the assemblies. The packers fit against the inside wall of the pipe and tend to seal fluid behind them, thus functioning to carry the pig through the pipeline along with the fluid product. The velocity of the pig will be dependent upon the pressure differential across the driving packer. It has previously been proposed to stabilize the velocity of a pig at a preselected magnitude by controlling valves in a packer of this type so as to regulate the pressure differential across the packer or to bypass the cups of the packer and thus control speed. In U.S. Patent 3,036,530 issued May 29, 1962 to R. L. Mills and Harvard J. Bryan, valves of such type are used which are controlled by a large centrifugal governor driven by a wheel forced against the pipeline wall. As the velocity of the pig increases, and thus the speed of rotation of the wheel increases, a flyball governor functions to open the valves in the front packer and slow down the pig. If the velocity is too slow, the valves will be closed as the flyballs collapse under lower centrifugal force. The apparatus depicted in the Mills et al. patent has not been entirely satisfactory for its intended purpose, however, due to the complex and bulky nature of the centrifugal governor, the positioning of the valves, and other factors. The Mills et al. governor assembly occupies almost the entire diameter of the pigging assembly over a substantial length, this being a marked disadvantage especially in pigs intended to survey small diameter lines. It will be noted that often in newly completed pipelines there will be surprisingly large amounts of debris in the form of rocks, dirt, animals, metal particles from the welds, etc. The debris is scattered upon impact and will thus find its way into any remote parts of the pigging apparatus, resulting in jamming of mechanisms which are not protected. The Mills et al. flyball governor and geared driving assembly is particularly vulnerable to this type of failure. Also the valves used for speed control in the Mills et al. governor, being positioned in the front of the front packer and receiving almost direct impact from the debris, are subject to jamming and thus loss of control. It is noted that power for operating the valves in the Mills et al. mechanism is obtained from movement of the assembly through the pipeline, no force for operating the valves existing when the pig is stopped or moving slowly.

A principal feature of this invention, therefore, is the provision of a technique for controlling the speed, or limiting the speed, in a "pigging" assembly which is propelled through a pipeline, particularly a speed limiting technique in which the mechanism utilized is protected such that it is not vulnerable to being rendered inoperative by debris and obstructions in the pipeline. Another feature is the provision of speed limiting techniques for a pipeline pig wherein the speed control mechanism obtains operating power from the line pressure, or from the pressure differential across the driving unit, as distinguished from obtaining operating power by mechanical linkage to a drive wheel or the like.

In accordance with a preferred form of the invention, a pipeline inspection assembly is provided which uses a cup-shaped rubber packer or the like for propelling the assembly, and a by-pass port through the packer is used to control venting of fluid therethrough, thereby providing control of speed by controlling the pressure differential across the packer. A valve is used to vary the degree of opening of the by-pass port, with the valve preferably positioned remote from the front of the assembly for protection against collisions and debris. The valve is opened or closed by a large piston coupled to the valve and powered by line pressure. The piston is most advantageously of the double acting type, positioned in a cylinder into which line pressure is applied to one side and the other side vented downstream, all under control of the speed of the assembly. In this manner the device used to detect speed need not provide power for operating the mechanism for changing the speed. The speed may be detected by a wheel bearing upon the pipeline wall, with a coupling from the wheel to a switch or counter which produces an electrical output to control a solenoid-type valve to route line pressure to the cylinder and vent the proper side of the cylinder.

The novel features believed characteristic of the invention are set forth in the appended claims. The invention itself however, as well as further objects and advantages thereof, may best be understood by reference to the following detailed description of particular embodiments, when read in conjunction with the accompanying drawings, wherein:

FIGURE 1 is an elevation view, partly in section, of a pipeline pigging assembly employing the speed control arrangement according to the invention;

FIGURE 2 is an enlarged detail view, partly in section, of the driving assembly utilized in the pigging apparatus of FIGURE 1, illustrating the speed control arrangement according to one embodiment of the invention;

FIGURE 2a is a detail view in section of a portion of the apparatus of FIGURE 2;

FIGURE 3 is a schematic diagram in block form of electrical circuitry utilized in the speed control arrangement according to the embodiment of FIGURE 2.

FIGURE 4 is an elevation view partly in section of a control valve according to another embodiment of the invention as may be utilized in the drive assembly otherwise as illustrated in FIGURE 2;

FIGURE 5 is a schematic illustration of another embodiment of an r.p.m. detector which may be utilized in the embodiments of FIGURES 2 and 4;

Figure 6:
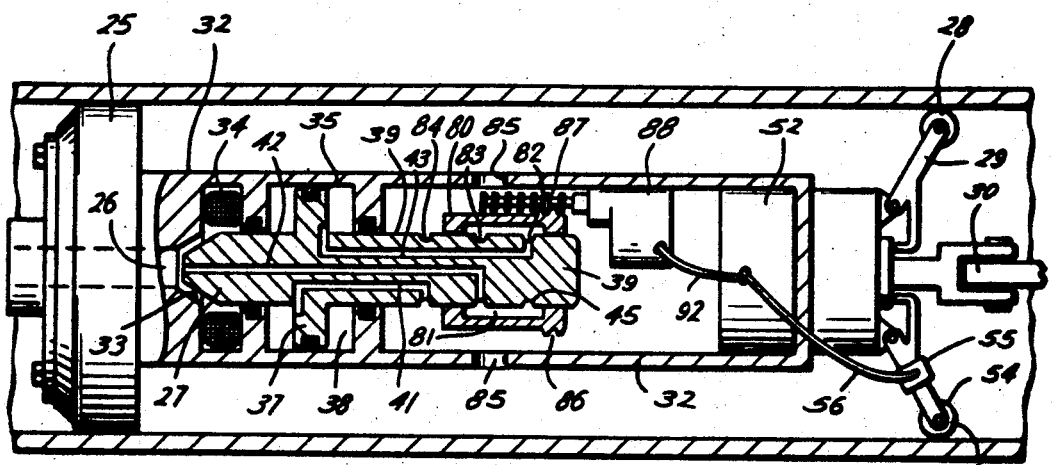
FIGURE 6 is an elevation view similar to FIGURE 2 of another embodiment of a control arrangement used in the invention.

Referring to FIGURE 1 of the drawings, pipeline pigging apparatus is shown of the type propelled through the pipeline by the fluid product for the purpose of detecting flaws or other conditions in the pipeline wall and recording the detected information. The pigging apparatus also includes a speed control system according to the invention. The apparatus is illustrated as comprising a drive section 11 including the speed control system, a detector section 12, and an instrumentation, power supply, and recorder package 13. The detector section 12 is generally of conventional form and includes a rubber packer 14 which is vented to permit the fluid product to pass through, along with a central frame for holding in position a plurality of detector shoes 15. The detector shoes are mounted on pivoted arms 16 which are biased in the outward position by springs. Although only a few of the detector shoes 15 are illustrated for simplicity, ordinarily a larger number would be used so that the entire circumference of the pipeline wall may be scanned in a manner described in copending application Ser. No. 680,573, filed herewith and assigned to the assignee of the present invention. As described in the copending application, axial magnetic flux is produced in the pipewall by steel brushes 18 which are pole pieces for a central magnetized core.

The detector shoes 15 usually include detector devices such as flux leakage detector coils positioned closely adjacent the surface which bears upon the pipeline walls, the shoes functioning to correctly position the flux leakage coils and to protect the coils against damage. It is noted that as the pigging apparatus travels down the pipeline, the detector shoes 15 will strike the various obstructions which are always present in the pipeline, the obstructions being icicles at welds, valve seats, flats, etc. If the pigging apparatus is traveling at excessive speeds, the detector shoes 15 may be damaged, as would the rubber packers and other parts of the apparatus. In addition, since the detector shoes are mounted with the spring-biased, pivoted arm arrangement, the shoes will be deflected away from the pipeline wall upon striking obstructions; if speed is excessive, the shoes will bounce excessively and be displaced by an unduly large amount every time the apparatus passes a weld or other obstruction. The disruption caused in the recorded flaw detection information becomes quite objectionable at high speeds because the shoes may be displaced from the walls or bouncing along the walls for a significant fraction of the distance between each weld. Thus, with the detector arrangement of FIGURE 1, it is important that the velocity of movement of the pigging apparatus in the pipeline be controlled.

The detector section 12 is connected by a universal joint type of coupling to the front of the power and instrumentation package 13. A pair of packers 20 and 21 may be used to support the package 13, these packers being vented to permit the fluid product in the line to pass through. Wheels 22 mounted on spring-biased arms may be used for centering purposes as is conventional. A bumper 23 is usually positioned at the rear of a pigging assembly to prevent damage should the apparatus be struck from the rear by a similar pigging assembly.

The drive and speed control section 11 according to the invention includes a sealed packer 25 which functions as the drive unit, this packer including a disk-shaped rubber member in front and cup-shaped rubber member in the rear, these being held by steel disks bolted together. A differential in fluid pressure between the right- and left-hand sides of the packer 25 functions to propel the entire assembly along the pipeline as the fluid acting against the lips of the cup-shaped rubber tends to hold the rubber sealed against the pipeline wall. When speed is excessive, the fluid product in the line may be by-passed through the driving section 11 by a through port 26. According to the invention, a plugging piston 27 operated in response to the velocity of the pigging apparatus varies the quantity of fluid vented through the port 26 as will be explained. Wheels 28 mounted on pivoted arms 29 act as a centering device for the drive section 11. The arms 29 may be urged outwardly by a spring-loaded drum and rocker arm arrangement as mentioned above. The section 11 is coupled to the detector section 12 by a universal joint arrangement 30 as is conventional. Preferably, one of the wheels 28 would include a speed detector as will be described.

Referring now to FIGURE 2 of the drawings, one embodiment of a driving section 11 utilizing the principles of this invention is illustrated. The operating parts of this section are contained within a generally cylindrical housing and frame member 32 which is supported coaxially in the pipeline 10 by the packer 25 at the front end and the wheels 28 and arms 29 at the rear end. The front end of the cylindrical frame 32 includes a through bore which provides the by-pass port 26. The movable valve 27 being cone-shaped bears upon a conical seat 33. A plurality of ports 34 connect a chamber just behind the seat 33 for the valve 27 with the space surrounding the driving section 11. Thus, under line pressure, the fluid product may by-pass the driving packer 25 by entering the ports 34, traversing the space between the valve 27 and the seat 33 and exiting through the port 26, to the extent that the valve 27 is backed off from the seat 33. The conical valve 27 is controlled by a fluid actuated displacement means such as piston 35 within a cylinder 36 which forms part of the cylindrical housing 32. The piston 35 is of much larger diameter than the valve 27 so that fluid pressure from the line applied to one side of the piston, with the other side vented downstream, will provide a great mechanical advantage in moving the valve 27.

The piston 35 is moved backward or to the right, pulling the valve 27 away from the seat, by admitting fluid under pressure to a front chamber 37 while venting a rear chamber 38 downstream. Conversely, the valve 27 is closed by moving the piston 35 forward or to the left by admitting line pressure to the chamber 38 while venting the forward chamber 37 downstream. To this end, an electrically operated valve 40 arrangement is provided to drive the piston 35, one form of such valve comprising a device as seen in a more detailed sectional view in FIGURE 2a. The front face of the piston 35 is connected by an internal passage 41 within the cylindrical shaft 39 to the valve. For venting either of the chambers 37 or 38 through the valve 40 downstream to the through port 26, a passageway 42 extends axially along the shaft 39 to the valve 40. Finally, the rear side of the piston 35 is connected by a passage 43 to the valve 40.

As seen in detail in FIGURE 3, the electrically operated valve 40 includes a pair of solenoid coils 44 and 45, both of which are actuated in parallel by conductors 46. The coils 44 and 45 operate a pair of cores 47 and 48, FIG. 2a, which are biased by springs (not shown) to stay in the positions illustrated until the coils are energized. Line pressure is applied by a port 49 and a chamber 49a so that with the coils deenergized fluid pressure from the line by-passes the core 48 and by the passage 43a reaches the passage 43 going to the rear of the piston 35. Under this condition, the front of the piston will be vented downstream via the passage 41, passage 41a in the valve 40, the chamber surrounding the core 47, a chamber 42a, and a passage 42b communicating with the passage 42 going to the port 26. With the piston 35 forced forward by the resulting pressure differential between the chambers 37 and 38, the valve 27 will be held firmly against the seat 33.

When the velocity of the pigging assembly is excessive, as determined by the systems to be described below, the coils 44 and 45 are energized, pulling the cores 47 and 48 against the opposite valve seats. This will permit line pressure to be applied from the chamber 49a past the core 47 into the passages 41a and 41 and thus to the chamber 37. At this time the chamber 38 will be vented downstream via the passages 43 and 43a, past the core 48, the chamber 42a and passages 42b and 42. Thus the piston 35 is forced backward and the valve 27 is opened full. This lowers the pressure differential across the packer 25 and causes the assembly to slow down.

The power applied to the coils 44 and 45 by the cable 46 is controlled by electronic circuitry within a sealed package 52, FIG. 2. The velocity of movement of the pigging assembly through the pipeline 10 may be detected by various techniques, one of which is the use of a magnet 54 inserted in a recess in one of the wheels 28. A detector 55 is mounted on the arm 29 associated with this wheel, and the detector is connected by a cable 56 to the instrumentation package 52. The detector 55 may merely comprise a coil in which a pulse of current is generated each time the magnet 54 passes as the wheel 28 rotates. The velocity of movement of the pigging apparatus will determine the frequency or pulse repetition rate of the pulses produced by the detector 55.

With reference to FIGURE 3 an electrical circuit suitable for controlling the operation of the coils 44 and 45 in the valve 40 is illustrated in block form. As noted above, the wheel 28 rotates at a speed corresponding to the velocity of the pigging apparatus, and the magnet 54 generates a pulse in the coil 55 upon each revolution. Such pulses are amplified and applied to an integrator 57 which produces a DC output level having a magnitude related to the pulse repetition rate or to the velocity of the pig. This DC output level is compared with a reference level as may be provided by a battery 58, and the resultant is applied to the input of a trigger circuit 59 which produces an output voltage only when the integrator output exceeds the reference level, i.e., when the speed is above a certain point. The output of the trigger circuit 59 drives a relay coil 60, normally open movable contact 61 for the relay being adapted when closed to connect a power supply to the cable 46 going to the coils 44 and 45.

FIG. 4 is an illustration of a solenoid operated valve for controlling the fluid actuated piston 35 of FIG. 2. The pilot valve 39a is connected to the right end of a shaft 39 with the passages 41 and 41a, 42 and 52a, and 43 and 43a in registration, as illustrated. A spool valve 65 controls the flow of fluid between annular grooves 62, 63, 64 and 72. The position of spool 65 is controlled by a solenoid winding 66, the spool being normally biased in the position illustrated by spring 67. Two annular slots 68 and 69 surround the spool valve, and an interior chamber 70 is vented to the exterior of the valve, and thus to line pressure by a port 71 which is shown dotted. With the spool in the position illustrated in FIG. 4, line pressure will be applied to the rear of piston 35, FIG. 2, by way of the port 71, chamber 70, annular slot 68, groove 64, passages 43a and 43. Meanwhile, the chamber 37 at the front of piston 35 will be vented downstream by way of passages of 41 and 41a, annular groove 62, annular slot 69, groove 63, and the passages 42a and 42. When solenoid 66 is energized by means of input connector 46 in response to some speed sensing means such as that illustrated in FIG. 3, spool 65 is drawn to the right so that the slot 68 bridges annular grooves 63 and 64, and annular slot 69 bridges annular grooves 62 and 72. In this position of the spool 65 pipeline pressure will be applied to the chamber 37 of the main piston by way of port 73, groove 72, annular slots 69, annular groove 62, and passages 41a and 41. In this same position, the rear side of piston 35, i.e., chamber 38, is vented downstream by way of passages 43 and 43a, grooves 64, slot 68, grooves 63, and passages 42a and 42.

In place of the speed detector utilized in the illustrative embodiments above, an r.p.m. switch, FIG. 5, may be employed which takes the form of a flexible cable 75, similar to a speedometer cable, coupled to the axle of one of the wheels 28 to rotate a magnetic cup 76 such that a center shaft of an electrical switch may be rotated through an angle depending upon the speed of the pigging apparatus or the speed of rotation of the wheel. The shaft of the electrical switch is mechanically coupled to a smaller cup-shaped ferromagnetic member 77 coaxial with and fitting within the magnetic cup 76. The cup 77 is spring biased in one direction by a spring 78 while rotation of the wheel 28 and thus the magnetic cup 76 will tend to rotate the cup 77 in the other direction by an amount dependent upon the speed of rotation. A wiper arm 79 of the electrical switch will bridge a set of contacts and thus energize solenoid coils 44 and 45, or coil 66, FIG. 4, when the speed is in excess of the acceptable range. In place of the flexible cable 75, the magnetic cup 76 may be driven by a pulley and belt arrangement connected to a wheel 28.

In another embodiment of the invention more positive and proportional control is provided for the valve 27 using an arrangement as seen in FIGURE 6. A sleeve valve 80 is provided on the end of the shaft 39, with the shaft being drilled for passageways 41, 42, and 43 as before. The cylindrical sleeve 80 movable along the shaft 39 contains a slot 81 shaped to span a pair of the periferial grooves 82, 83 and 84 in the shaft 39, these grooves being connected to the passageways 41, 42 and 43, respectively. In the position illustrated in FIGURE 6, fluid at line pressure will enter aperture 85 in frame member 32 will be admitted through the groove 84 and the passageway 41 into the chamber 37 in front of the piston, while the rear chamber 38 will be vented downstream through the passageway 43, the groove 82, the slot 81, the groove 83, the passageway 42, and the through port 26. Line pressure is admitted to the space surrounding the shaft 39 and the sleeve 80 by ports 85 which may contain gratings to prevent debris from entering the interior of the cylindrical housing 32. With the sleeve 80 in the position of FIGURE 6, line pressure will tend to move the piston 35 backward and open the valve 27 to thereby tend to cause the pigging assembly to slow down since more fluid will be bypassed through the drive packer 25, tending to equalize the pressure or reduce the differential across this packer. On the other hand, if the sleeve 80 is moved to a forward position as seen in the fragmentary view of FIGURE 6a, line pressure will be admitted to the rear of the cylinder 35 by way of the groove 82 and the passageway 43, while the front chamber 37 will be vented by the passageway 41, the groove 84, the slot 81, the groove 83, and the passageway 42 going to the through port 26. Fluid pressure will thus move the piston 35 forward and tend to close the valve 27, speeding up the assembly because less fluid will be by-passed.

Figure 6A:
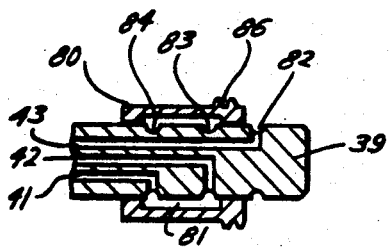
FIGURE 6a is a detail view in section of a portion of the apparatus of FIGURE 6.
Figure 6B:
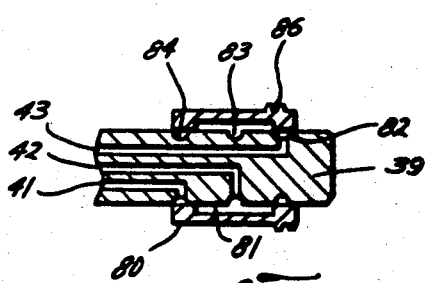
FIGURE 6b is a detail view in section of the apparatus of FIGURE 6a in another position.

The sleeve 80 is moved back and forth on the shaft 39 by a worm gear arrangement including gear teeth 86 on the sleeve 80 and a worm 87 driven by a reversible DC electric motor 88. When the shaft of the motor and thus the worm 87 turn in one direction, the sleeve 80 will be driven forward, while reversing the motor will drive the sleeve 80 backward. It is noted that the motor 88 is mounted on the frame 32 which is fixed relative to the sleeve 80 and the movable shaft 39. Thus, when the sleeve 80 is moved to a forward position, as seen in FIGURE 6a, for example, the shaft 39 will tend to follow which will in effect move the sleeve backward relative to the shaft 39, and so the control assembly seeks a neutral position wherein neither of the chambers 37 and 38 is vented and neither has pressure applied thereto. This condition is illustrated in FIGURE 6b. A steady state condition will tend to be assumed wherein no pressure differential exists between the chambers 37 and 38 and the valve 27 is fixed relative to the sleeve 33, so long as the speed is within an acceptable range.

Figure 7:
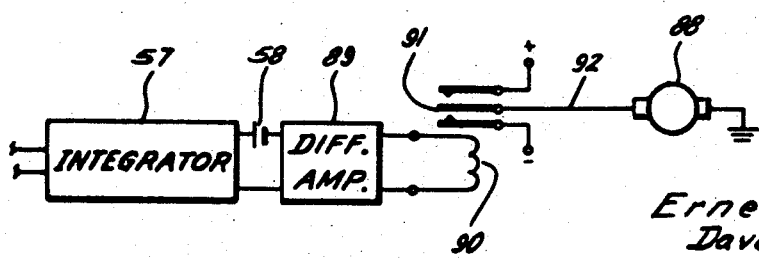
FIGURE 7 is an electrical diagram, similar to that of FIGURE 3, for use with the embodiment of FIGURE 6.

The current applied to the motor 88 and the direction of this current may be controlled by electronic circuitry similar to that of FIGURE 3 but including a differential amplifier 89 instead of the trigger circuit 59, the modified circuitry being seen in FIGURE 7. The output of the differential amplifier 89 will be of one polarity when the speed is above a certain point and will be of the opposite polarity when the speed is below a certain point, determined by the reference level 58. The output of the differential amplifier drives a relay coil 90, a movable contact 91 for the relay coil functioning to connect either a positive or negative supply to the cable 92 going to the motor 88. Thus the motor 88 may be energized with current of either polarity when the output of the differential amplifier is of a magnitude great enough to move the armature of the relay 90. Otherwise, the motor 88 will be deenergized, for neutral positions of the relay armature when the speed is within an acceptable range. Of course, energization of the motor 88 with current of one polarity will rotate the worm 87 in one direction and thus move the sleeve 80 in one direction, while current of the opposite polarity will rotate the worm 87 and move the sleeve 80 in the opposite direction. Control of the opening of the valve 27 will thus be effected as explained above.

Similarly, the circuitry of the embodiment of FIGURE 5 may be used with the reversible motor 88 of FIGURE 6 by merely providing another contact for the switch or the wiper 79 to engage.

While this invention has been described with reference to particular embodiments, it is of course understood that this description is not to be construed in a limiting sense. Various modifications of the disclosed embodiments, as well as other embodiments of the invention, may be apparent to persons skilled in the art upon reference to this description.

What is claimed is:

1. In pipeline inspection apparatus of the type propelled through a pipeline by a fluid product being transported under pressure, speed control means comprising:
a resilient seal member surrounding a part of said apparatus and adapted to circumferentially engage the interior wall of the pipeline to retard passage of said fluid product,
a valve positioned in the apparatus to selectively bypass fluid through said seal member,
fluid actuated displacement means mechanically coupled to the valve for operating such valve,
velocity detector means in said apparatus for producing electrical controls related to the velocity of the apparatus through the pipeline, and
control means responsive to said electrical controls for applying fluid under pressure from the interior of the pipeline to the fluid displacement means in response to said electrical controls.

2. In apparatus according to claim 1:
a longitudinal passageway connecting the downstream side of said seal member with said valve means, the passageway being of substantial length to thereby shield the valve against collision with and fouling by debris in such pipeline.

3. In apparatus according to claim 1:
said fluid actuated displacement means being of double acting type, and
said control means including means for selectively applying fluid under pressure to either side of the double acting displacement means while venting the other side to the downstream side of said seal member.

4. In apparatus according to claim 3, said fluid actuated displacement means being a piston and cylinder arrangement with the valve being coupled to the piston.

5. In apparatus according to claim 4, the other side of the piston being vented downstream at a long passageway which connects the valve with the downstream side of the seal member.

6. In apparatus according to claim 5, the velocity detector including a wheel bearing upon the pipeline wall and means coupling the wheel to switch means for energizing the control means.

7. In apparatus according to claim 6, the means coupling the wheel to switch means including magnetic means in the wheel and a detector coil responsive to passage of the magnetic means.

8. In apparatus according to claim 6, the means coupling the wheel to switch means including a magnetic coupling to a spring-bias mechanical operating member for the switch means.

9. In apparatus according to claim 6, the control means being a solenoid-operated valve.

10. In apparatus of the type propelled through a pipeline by fluid in the pipeline, control means comprising:
a seal member for trapping fluid and thereby propelling the apparatus,
valve means adapted to vent fluid past the seal member when open,
fluid actuated displacement means mechanically coupled to the valve means for opening and closing the valve means,
electrically-operated means for routing said fluid under pressure to the fluid actuated displacement means in response to electrical controls, and
detector means responsive to selected conditions for producing electrical controls for applying to the electrically-operated means.

11. In apparatus according to claim 10, said detector means being responsive to the speed of movement of the apparatus through the pipeline.

12. In apparatus according to claim 10, said electrically-operated means applying fluid under pressure to one side of the fluid actuated displacement means and venting the other side downstream of the seal member.

13. In apparatus according to claim 10, a long passageway connecting the downstream side of the seal member to the valve means to thereby shield the valve means from obstructions in the pipeline.

14. In apparatus according to claim 10, the fluid actuated displacement means comprising a piston and cylinder arrangement with the effective transverse area of the piston being much larger than that of the valve means whereby line pressure provides a mechanical advantage in operating the valve.

15. In apparatus according to claim 10, the fluid actuated displacement means comprising a double-acting piston and cylinder arrangement with the electrically-operated means routing fluid under pressure selectively to either side of the piston.

16. In apparatus according to claim 15, the electrically-operated means venting the other side of the piston downstream.

17. In apparatus according to claim 16, the other side of the piston being vented downstream through said valve means.

18. In apparatus according to claim 17, the valve means being connected to the downstream side of the seal means by a long passageway to thereby shield the valve means.

19. In apparatus according to claim 18, the detector means being responsive to the speed of the apparatus, the valve means remaining closed until the speed exceeds a given level, and an electrical control being produced when said given level is exceeded to energize the electrically-operated means.

20. In apparatus according to claim 19, the detector means including a wheel bearing upon the wall of the pipeline.

21. In apparatus according to claim 20, a magnetic insert in said wheel and means for detecting passage of the insert for providing an indication of r.p.m. of the sheel.

22. In apparatus according to claim 18, the detector means being responsive to the speed of the apparatus, the electrically-operated means being operative to control fluid applied to the piston and cylinder arrangement in response to the speed of the apparatus exceeding or being less than a given range of speed to thereby cause operation of the valve means to slow down or speed up the apparatus.

References Cited

UNITED STATES PATENTS

| | | | |
|---|---|---|---|
| 2,518,330 | 8/1950 | Jasper | 104—138 |
| 3,036,530 | 5/1962 | Mills | 104—155 |
| 3,243,697 | 3/1966 | Schmidt | 324—37 |

ARTHUR L. LA POINT, Primary Examiner

H. BELTRAN, Assistant Examiner

U.S. Cl. X.R.

15—104.06; 29—407; 73—40.5, 432; 104—138, 154; 118—408; 137—802; 138—91; 251—30, 44; 254—134; 324—37